(12) United States Patent  (10) Patent No.: US 7,700,018 B2
Lavoie et al.  (45) Date of Patent: Apr. 20, 2010

(54) POSITIVE ELECTRODE FILMS FOR ALKALI METAL POLYMER BATTERIES AND METHOD FOR MAKING SAME

(75) Inventors: Paul-André Lavoie, Montreal (CA);
Richard Laliberté, St-Julie (CA);
Simon Besner, Côteau du Lac (CA);
Yvon Gagnon, Charlemagne (CA);
Martin Simoneau, St-Bruno (CA);
Alain Vallée, Varennes (CA)

(73) Assignee: Bathium Canada Inc., Boucherville (CA)

( * ) Notice: Subject to any disclaimer, the term of this patent is extended or adjusted under 35 U.S.C. 154(b) by 520 days.

(21) Appl. No.: 10/382,539

(22) Filed: Mar. 7, 2003

(65) Prior Publication Data

US 2003/0215710 A1  Nov. 20, 2003

(51) Int. Cl.
*C04B 35/00* (2006.01)
*B29C 47/38* (2006.01)
*B29C 67/20* (2006.01)

(52) U.S. Cl. .................. 264/104; 264/102; 264/105; 264/173.1; 264/175; 264/210.1; 264/211; 264/211.21; 264/211.23; 264/288.4; 264/288.8; 429/212; 429/231.95; 429/232

(58) Field of Classification Search .............. None
See application file for complete search history.

(56) References Cited

U.S. PATENT DOCUMENTS

| | | | |
|---|---|---|---|
| 4,320,184 A * | 3/1982 | Bernstein et al. .......... 429/217 |
| 4,502,903 A | 3/1985 | Bruder | |
| 4,976,904 A | 12/1990 | Bilhorn | |
| 5,143,805 A | 9/1992 | Anderman et al. | |
| 5,240,655 A * | 8/1993 | Troffkin et al. .............. 264/28 |
| 5,277,729 A * | 1/1994 | Endo et al. .................. 156/157 |
| 5,316,556 A | 5/1994 | Morris | |
| 5,334,334 A * | 8/1994 | Koksbang .................... 264/28 |
| 5,346,385 A * | 9/1994 | McAleavey ................. 425/363 |
| 5,482,587 A * | 1/1996 | McAleavey ................. 156/243 |
| 5,725,822 A | 3/1998 | Keller et al. | |
| 5,749,927 A | 5/1998 | Chern et al. | |
| 6,368,365 B1 * | 4/2002 | Chi et al. ................... 29/623.1 |
| 6,524,742 B1 * | 2/2003 | Emanuel et al. ............ 429/129 |
| 6,589,299 B2 * | 7/2003 | Missling et al. ............ 29/623.5 |
| 2003/0062259 A1 * | 4/2003 | Mushiake et al. ......... 204/290.01 |
| 2004/0130061 A1 * | 7/2004 | Lavoie et al. .............. 264/211.21 |
| 2005/0037262 A1 * | 2/2005 | Vallee et al. ................ 429/217 |

FOREIGN PATENT DOCUMENTS

| | | |
|---|---|---|
| DE | 196 42 878 A1 | 5/1997 |
| DE | 101 15 210 A1 | 9/2002 |
| FR | 2 553 937 | 4/1985 |
| WO | WO 00/51806 | 9/2000 |
| WO | WO 02/065563 | 8/2002 |

* cited by examiner

*Primary Examiner*—Jeffrey Wollschlager
(74) *Attorney, Agent, or Firm*—Osler, Hoskin & Harcourt LLP

(57) ABSTRACT

A process for extruding a thin positive electrode sheet having at least 40%/wt of solid content for a lithium polymer battery through a single or twin screw extruder is disclosed as well as a positive electrode sheet produced therefrom. A mixture of active cathodic intercalation material, lithium salt and electronic conductive material is mixed with a polymer of the polyether family in a ratio of at least 40% of total weight into the mixing chamber of an extrusion machine and extruded through a classical sheet die into a thin cathode sheet or film onto a substrate in sheet form.

7 Claims, 6 Drawing Sheets

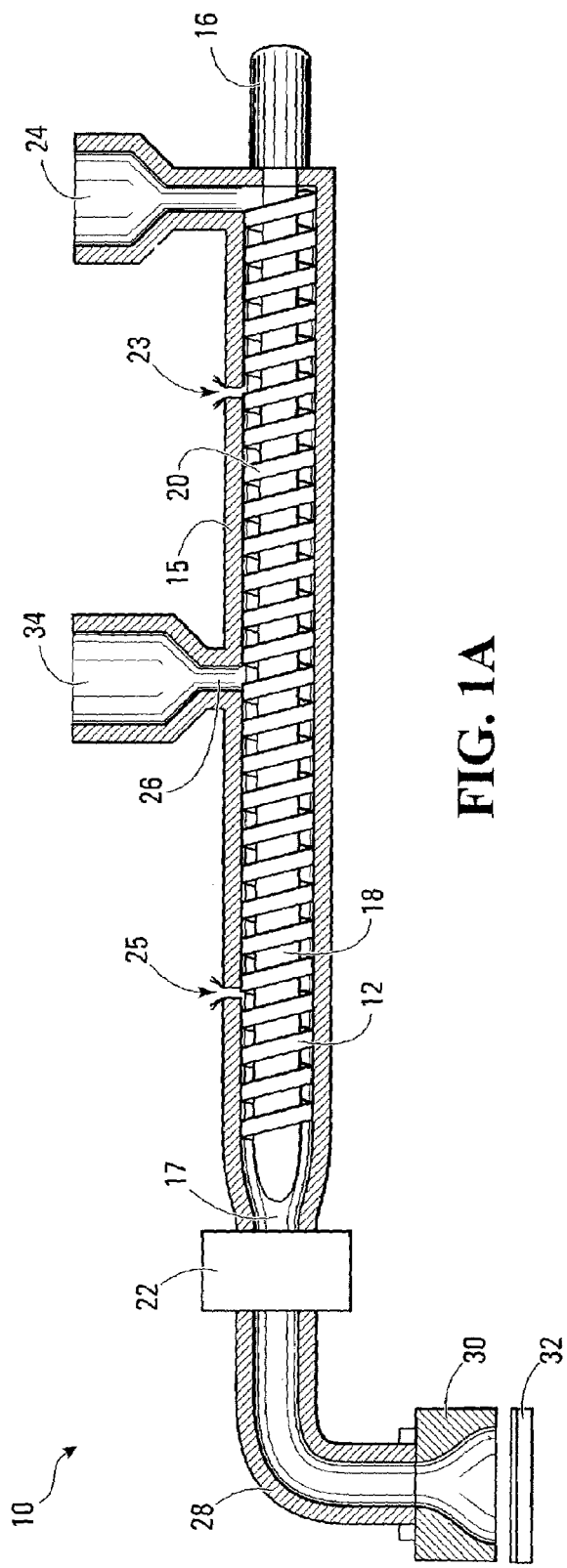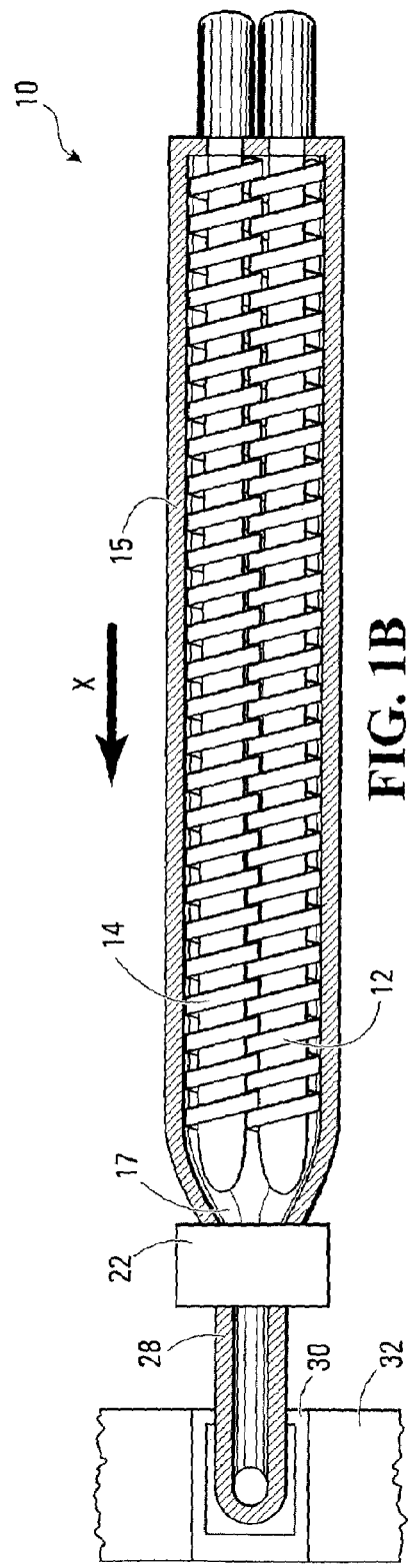

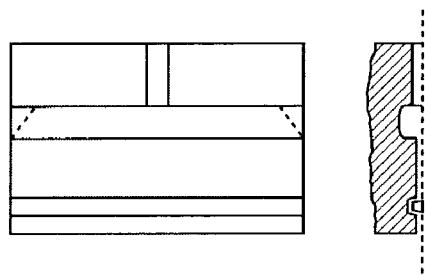 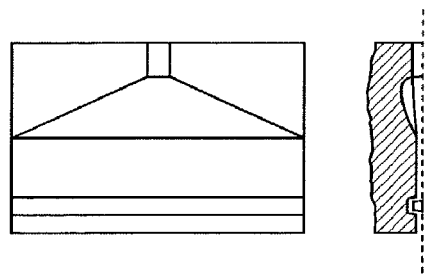
FIG. 4A          FIG. 4B
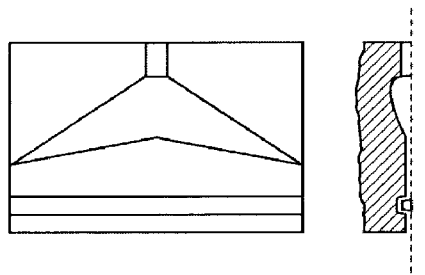 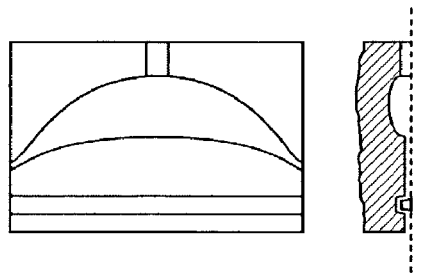
FIG. 4C          FIG. 4D

POSITIVE ELECTRODE FILMS FOR ALKALI METAL POLYMER BATTERIES AND METHOD FOR MAKING SAME

FIELD OF THE INVENTION

The present invention generally relates to alkali metal polymer batteries and, more specifically, to positive electrode sheets for alkali metal polymer batteries that are made by a continuous extrusion process for forming solid polymer electrolyte-cathode sheets.

BACKGROUND OF THE INVENTION

Rechargeable batteries manufactured from laminates of solid polymer electrolytes and sheet-like electrodes display many advantages over conventional liquid electrolytes batteries. These advantages include: lower overall battery weight, high power density, high specific energy, and longer service life. In addition, they are more environmentally friendly since the danger of spilling toxic liquid into the environment is eliminated.

Solid polymer battery components generally include: positive electrodes (also referred to as cathodes), negative electrodes (also referred to as anodes), and an insulating material capable of permitting ionic conductivity, such as a solid polymer electrolyte, sandwiched therebetween. The anodes are usually made of light-weight metals foils, such as alkali metals and alloys thereof typically lithium metal, lithium oxide, lithium-aluminum alloys and the like. The composite cathodes are usually formed of a mixture of active material such as a transitional metal oxide, an electrically conductive filler, usually carbon particles, an ionically conductive polymer electrolyte material and a current collector usually a thin sheet of aluminum.

Composite cathode films are usually obtained by coating onto a current collector a mixture of a solvent and cathode materials with a doctor blade, for instance, and evaporating the solvent. This process is inefficient for the mass production of cathode films and results in cathode films having a relatively high porosity, and therefore decreased density.

Since solid polymer electrolytes are usually less conductive than liquid polymer electrolytes, solid or dry electrochemical cells must be prepared from very thin films (total thickness of approximately 35 to 250 microns) to compensate for the lower conductivity, with a high film contact surfaces and provide electrochemical cells with high power density. Solid cathode films must therefore be produced into very thin films of generally ranging from about 35 to 125 microns.

One of the most efficient manufacturing processes for obtaining thin sheets is the process of continuous extrusion. U.S. Pat. No. 5,725,822 to Keller et al. discloses a method for extruding electrode material by liquid injection. The solid particulate of active electrode materials are partially mixed with a minor portion of the components of the polymer electrolyte and fed into a first feed throat of the extruder while the remaining polymer electrolyte composite, preferably rich in liquid components including at least one solvent, is fed downstream through a second feed throat. The process has been found to provide a composite having a high ratio of solid active material electrode/electrolyte and by separately mixing the components, the electrode composition may be adjusted to provide optimal proportions of all materials for a given application. However, this process is limited to polymer electrolyte binders capable of withstanding the extrusion processing conditions, in particular the temperature, pressure and shear conditions such as polyacrylonitrile (PAN), polyvinylidene difluoride (PVDF), polyvinylpyrrolidone (PVP) and the like mixed with a solvent. The use of solvents in the extruded mixture results in a thicker composite cathode sheet that displays a high porosity and a rough surface finish. The latter characteristics are generally detrimental to the efficiency of the electrochemical cell produced.

U.S. Pat. No. 5,316,556 to Morris also discloses an apparatus and method for extruding a cathode in which the cathode material is mixed to an homogenous state, and then transported under constant or increasing shear stress to a point of extrusion such that it is extruded at constant rate. The cathode material disclosed is referred to as a shear thinning material as it exhibits non-Newtonian fluid characteristics; that is its viscosity decreases as the material is subjected to increasing shear stress. The solution proposed to transport the melted 'shear thinning' cathode material smoothly to the extruder exit nozzle is simply to maintain a minimum pressure and therefore a minimum amount of shear stress on the 'shear thinning' cathode material to ensure that the viscosity or flow resistance of the cathode material remains below a certain value to prevent blockage of the cathode material in the extruder. Experience has shown however that such a simple technique is inadequate for a wide variety of cathode materials, especially when the solid content of the cathode material is above 30% by weight.

Cathode materials having a high solid content of active cathodic material and conductive filler (above 30%) like polymers of the polyether family such as polyethylene oxide having a high percentage of solid particles of vanadium oxide and carbon cannot withstand normal extrusion conditions and, more particularly, high temperatures and high shear conditions. Polyethers have a low melting point (around 50° C.) and are chemically unstable under extrusion conditions thereby making them extremely difficult to process through an extruder to form a thin positive electrode composite sheet. Neither Keller et al. nor Morris provide a viable process for extruding cathode thin films made of a polyether binder having a high percentage of solids.

Thus there is a need for a solid polymer electrolyte-cathode sheet having a high solid content which can be extruded and a method for extruding a cathode sheet having a high solid content.

SUMMARY OF THE INVENTION

Under a first broad aspect, the invention seeks to provide a positive electrode film for an alkali metal polymer battery, the positive electrode thin film comprises an ionically conductive polymer electrolyte material, an active cathodic intercalation material, a lithium salt, and Carbon and Graphite particles as electronically conductive materials in a ratio of Carbon/Graphite ranging from about 0.1:1 to 4:1. The positive electrode film comprises at least 40%/wt of active cathodic intercalation material, lithium salt, and carbon and graphite particles.

Preferably, the positive electrode thin film comprises more than 50%/wt of active cathodic intercalation material; lithium salt; and Carbon and Graphite particles; the thickness of the positive electrode thin film is between about 35 microns and about 125 microns and the ratio of Carbon/Graphite ranges from about 0.5:1 to 2:1 Advantageously, the positive electrode thin film further comprises an additive consisting of an ultra fine powder of metal oxide such as fumed silica, aluminum, or titanium oxide with a particle size between about 7 and 40 nm.

Under a second broad aspect, the invention also seeks to provide a process for extruding a positive electrode sheet having at least 40%/wt of solid content for an alkali metal polymer battery through a single or twin screw extruder. The process comprises:
(a) introducing a polyethylene oxide in a first feed throat of the extruder;
(b) introducing downstream from the first feed throat, a mixture of active cathodic intercalation material, lithium salt and electronic conductive material; said mixture being introduced in a quantity sufficient to be at least 40%/wt of the positive electrode sheet to be produced;
(c) mixing the polyethylene oxide with the mixture introduced in (b) into a single or twin screw section of said extruder;
(d) extruding a positive electrode material obtained in c) through a die in the form of a sheet; and
(e) depositing the positive electrode material onto a substrate.

Advantageously, the thickness of the positive electrode sheet is further reduced by calendering, laminating or rolling the extruded positive electrode sheet and/or by stretching the positive electrode sheet onto the substrate by selecting a speed of the substrate at or near the die opening of the extruder such that the speed of the substrate exceeds the rate of discharge of the positive electrode material through thereby reducing the thickness of the positive electrode sheet deposited thereon. Preferably, the final thickness of the positive electrode sheet is between about 25 microns and about 125 microns and more preferably between about 35 microns and about 70 microns.

Under a third broad aspect, the invention further seeks to provide an electrochemical cell comprising a lithium or lithium alloy based negative electrode, a solid polymer electrolyte separator and a positive electrode film. The positive electrode film comprises an ionically conductive polyether electrolyte material, an active cathodic intercalation material, a lithium salt, and carbon and graphite particles as electronically conductive materials in a ratio of carbon/graphite ranging from about 0.1:1 to 4:1. The positive electrode film comprises at least 40%/wt of active cathodic intercalation material, lithium salt; and Carbon and Graphite particles.

Under a fourth broad aspect, the invention seeks to provide a process for extruding a positive electrode sheet having at least 40%/wt of solid content through a single or twin screw extruder. The process comprises: mixing a polymer binder, an active cathode material, and an electronic conductive material into a single or twin screw section of the extruder; extruding a positive electrode material through a die opening in the form of a sheet; feeding the positive electrode material between a pair of rollers; and depositing the positive electrode material onto a substrate traveling near the rollers.

BRIEF DESCRIPTION OF THE DRAWINGS

A detailed description of preferred embodiments of the present invention is provided herein below with reference to the following drawings, in which:

FIG. 1A is a schematic cross-sectional side view of a typical twin screw extrusion machine illustrating the inner parts and channels of the extrusion machine;

FIG. 1B is a schematic top plan cross-sectional view of a typical twin screw extrusion machine illustrating the inner parts and channels of the extrusion machine;

FIGS. 4A to 4D are schematic top plan views of the inner configuration of typical sheet dies.

Figure 2A:
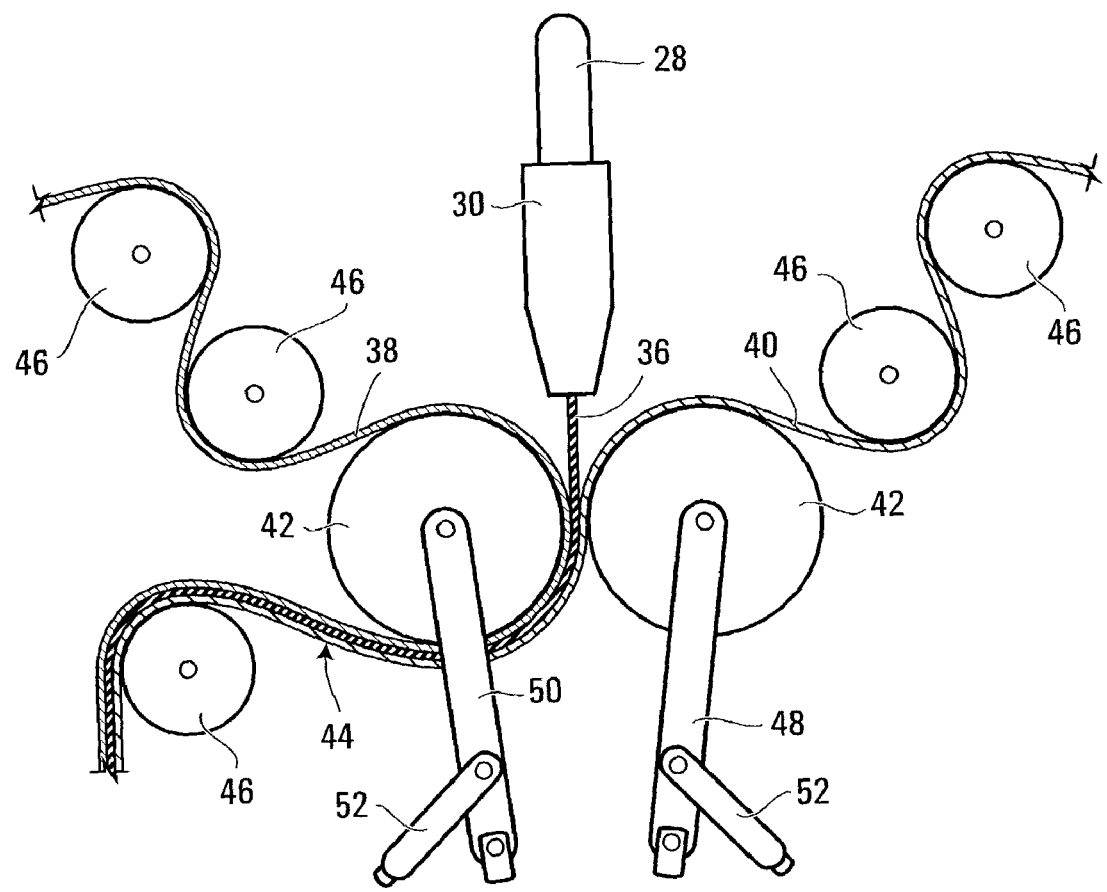
FIG. 2A is a schematic front view of the extrusion die showing the positive electrode film being extruded onto a substrate.

In the drawings, preferred embodiments of the invention are illustrated by way of examples. It is to be expressly understood that the description and the drawings are only for the purpose of illustration and as an aid to understanding. They are not intended to be a definition of the limits of the invention.

DETAILED DESCRIPTION

With reference to FIGS. 1A and 1B, there is shown a typical twin screw extruding machine 10 having a pair of screws 12 and 14 powered by standard electric motors 16. Screws 12 and 14 feature threads 20 and a central shaft 18 having an increasing diameter such that the material being mixed into the mixing chamber 15 is intimately mixed and under varying pressure as it is transported in the direction X. Extruding machine 10 further comprises a first feed throat 24 at a first end of the mixing chamber 15 and a second feed throat 26 located approximately near the middle of mixing chamber 15. The forward end 17 of mixing chamber 15 is of conical shape to direct the melted material being transported into a gear pump 22 provided to control the flow rate of the melted material exiting mixing chamber 15. On the exit side of gear pump 22 is an elbow-shaped conduit 28 leading to a die 30 through which the melted material is discharged at constant rate onto a substrate sheet or film 32 traveling at constant speed. Commercially available extruding machines featuring single or twin screw design may be used for the mixing and melting process however it has been found that twin screw designed extruding machine provides a superior mixing of the components of the cathode material.

As shown more specifically in FIG. 1a, vents 23 and 25 are featured along the upper wall of mixing chamber 15 to eliminate volatile matter still remaining in the polymer during the heating and mixing process. Two vents are depicted in this particular embodiment, however any number of vents may be provided depending on the amount of volatile matter still remaining in the polymer. Vents 23 and 25 are located approximately between the central axis of twin screws 12 and 14 such that melted material will not be push out through vents 23 and 25 by the respective action of screws 12 and 14. The configuration of the screws provides for two decompression zones substantially aligned with vents 23 and 25 and two mixing zones located before each vent 23 and 25. In the decompression zones, the thread pitch of the screws or screw is greater than in the mixing zones thereby reducing the pressure of the melted material and preventing spillage of the melted material through the vents. The configurations of screws 12 and 14 provides for an homogeneous cathode material without degrading its polymer component.

The cathode or positive electrode material according to the invention preferably includes a mixture of ionically conductive polymer electrolyte material such as polyethylene oxide, active cathodic material such as vanadium oxide, an electrically conductive filler such as carbon and graphite particles, and lithium salt. In a preferred embodiment, the positive electrode material includes between 25%/wt and 30%/wt of polyethylene oxide; between 57%/wt and 67%/wt of vanadium oxide; between 1.5%/wt and 5%/wt of carbon and graphite particles; and between 4%/wt and 10%/wt of lithium salt. A small portion of fumed silica and some antioxidant in minute proportion may also be added to the mixture in some instances.

Plasticizers or lubricants in small quantity (less than 10%/wt) may also be included in the polymer to enhance mixing of the polymer with the solid content outlined above and/or to reduce the viscosity of the mixture to facilitate the extrusion of the composite cathode material. Plasticizers or lubricants such as polyvinylidene fluoride (PVDF), co-polymer polyvinylidene fluoride/hexafluoroisopropanol (PVDF-HFP), polyvinyl fluoride (PVF), polyethylene glycol dimethyl ether, tetraglyme, triglyme, ethylene carbonate, propylene carbonate, EO/PO diglycol and EO/PO monoglycol or distearates may be used to that effect. Preferably, fluoride polymers such as PVDF, PVDF-HFP, and PVF or polyethylene glycol dimethyl ether are added to the polymer in small quantity; these polymers do not significantly reduce the ionic conductivity or the solid character of the cathode material being extruded. Water may also be used as a plasticizer to reduce the viscosity of the compound and ease of mixing of the solid content with the polyethylene oxide in proportion ranging from 0.005% up to 5% and preferably between 0.1% and 0.8%. The water is dissipated in vapor during the mixing and melting process in the mixing chamber 15.

The vanadium oxide particle size is selected such as to enable an adequate mixture of the vanadium oxide with the polyethylene oxide in mixing chamber 15. Preferred particle sizes of vanadium oxide range from about 0.3 micron to about 20 microns.

As an example, polyethylene oxide is introduced into mixing chamber 15 through the first feed throat 24 where it begins to melt. Vanadium oxide $LiV_3O_8$, carbon and graphite particles in a ratio ranging from 0.1:1 to 4:1 and preferably of about 1:1, and optionally an ultra fine powder of fumed silica are pre-mixed into reservoir 34 and then introduced into mixing chamber 15 through the second feed throat 26. Salt based on lithium can be introduced into mixing chamber 15 through the second feed throat 26, or may alternatively be introduced through a third feed throat (not shown) located between first feed throat 24 and second feed throat 26. As well, plasticizers or lubricants as described above may be mixed with the polyethylene oxide prior to introduction into the mixing chamber 15 or may be introduced into mixing chamber 15 through second feed throat 26 with a view of modifying the rheological properties of the slurry such as reducing the viscosity of the cathode slurry and/or promoting the mixing of the solid content with the polyethylene oxide. In mixing chamber 15, the pre-mixed components outlined above are further mixed with the polyethylene oxide through the actions of the twin screws and blended into an homogeneous slurry which is transported under pressure in direction X to the forward end 17 of mixing chamber 15. The slurry is pushed into gear pump 22 which regulates or controls the flow rate of the slurry through conduit 28 and ultimately though die 30. As the cathode slurry enters die 30, its flow path is reshaped such that the cathode material slurry exits die 30 shaped as a thin film of between 40 and 200 microns and is deposited onto a thin sheet substrate 32 of polypropylene or polyethylene or a thin metal foil such as an aluminum or, copper foil.

As shown in FIG. 2A, in an embodiment of the continuous manufacturing process of a thin film positive electrode for an alkali metal polymer electrochemical cell, the cathode or positive electrode film 36 exiting die 30 is deposited between a pair of traveling substrate sheets 38 and 40 supported and driven at constant speed by a pair of flat cylinder rollers 42. In a preferred embodiment, cathode film 36 is deposited between a current collector sheet 40 and a polypropylene sheet 38. Cathode film 36 is deposited directly onto the current collector of the electrochemical cell being produced. Preferably, die 30 is oriented vertically and is positioned as close as possible to the pair of flat cylinder rollers 42. The three-layer film 44 is then carried away and rolled up for storage or transported to further processing stations to complete the assembly of the alkali metal polymer electrochemical cell. Various cylinders 46 are provided along the path of the substrate films 38 and 40 and the three-layer film 44 to provide the required tension such that the films remain flat. To prevent adhesion of the films or sheets to the flat cylinder rollers 42, the latter are maintained at temperatures below the ambient temperature and preferably at a temperature generally ranging from about −5° C. to about −30° C. Flat cylinder rollers 42 may also be provided with an anti-adhesive liner to prevent such adhesion.

Flat cylinder rollers 42 are mounted on pivotal support structures 48 and 50, each having an hydraulic cylinder 52 adapted to adjust the position of the cylinder rollers 42 and to also to adjust the pressure applied onto the three-layer film 44 as it passes in between the cylinder rollers 42. It should be expressly understood that other means for adjusting the position of the cylinder rollers 42 and the pressure applied on the three-layer film 44 by the cylinder rollers 42 are contemplated and within the reach of a person skilled in the art, and as such are within the scope of the present invention. Although the cathode film 36 already features smooth surfaces, the pressure applied by cylinder rollers 42 equalizes the surface finish of both surfaces to provide a smooth and even surface. The surface finish or roughness ratio of the extruded cathode material is important to the efficiency of ionic exchange between the electrolyte separator and the cathode of the electrochemical cell to be assembled. The ionic exchange efficiency diminishes with the coarseness of the cathode surface.

The pressure applied on the positive electrode film 36 may also be used to further reduce its thickness. The final thickness of the cathode film 36 should be between about 25 and 125 microns, and preferably between about 35 and 70 microns. Cathode film 36 may be extruded at a thickness of up to 250 microns, and then reduced by lamination, calendering, or rolling as is well known in the art to the desired thickness. However in a preferred embodiment of the invention, the cathode film 36 is extruded at a thickness of about between 35 and 70 microns directly onto substrate 32 of polypropylene or polyethylene or the current collector in the form of aluminum or copper foil.

As a variant of the manufacturing process, the extruded cathode film 36 may also be stretched onto the substrate 32 in order to reduce its final thickness. The stretching of the extruded cathode material is achieved by selecting the speed at which the substrate 32 travels at the contact point between the extruded cathode material and the substrate 32 near exit of die 30 such that the speed of substrate 32 exceeds the rate of discharge of the cathode material at the die opening. The speed differential between the substrate 32 and the cathode material exiting die 30 will stretch the cathode film 36 thereby reducing its thickness.

Figure 2B:
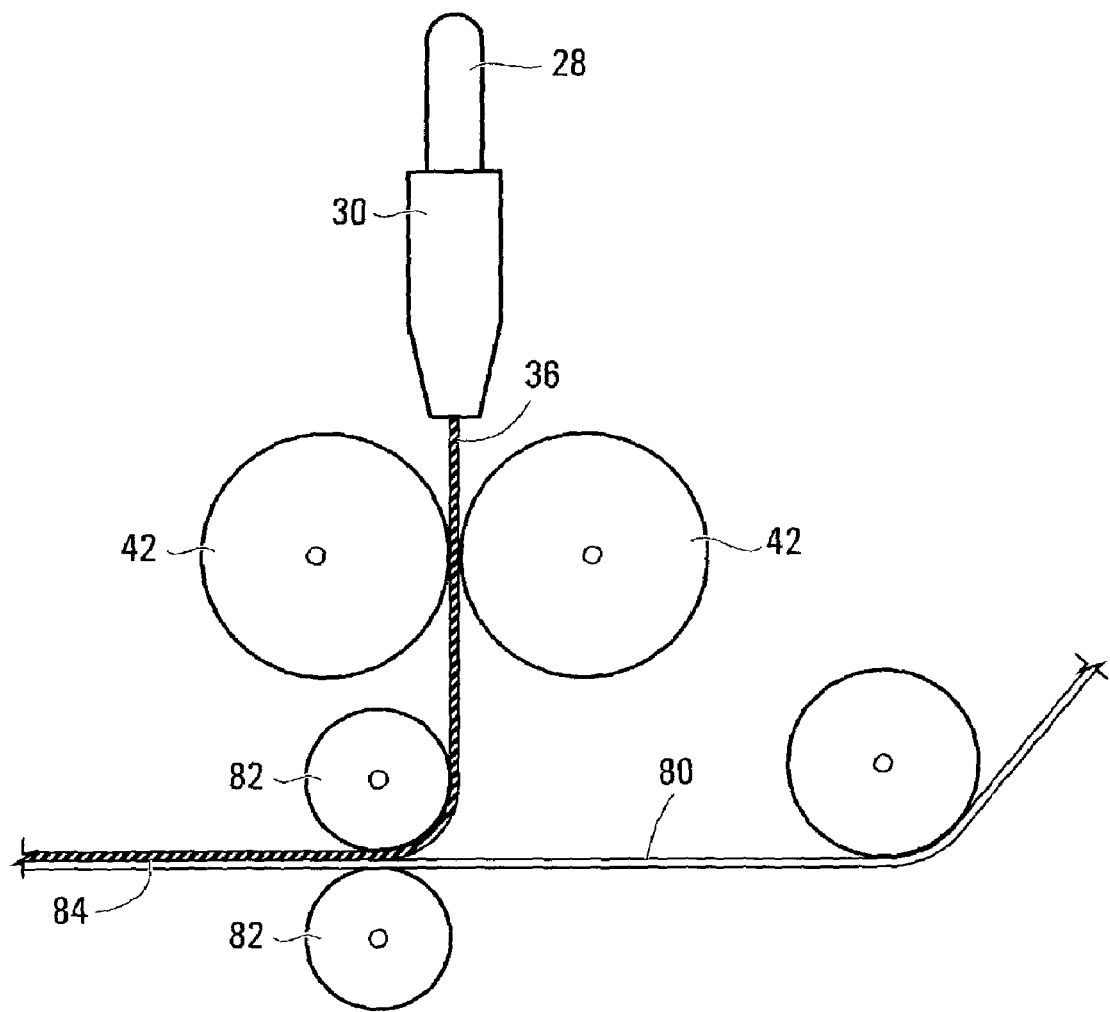
FIG. 2B is a schematic front view of the extrusion die showing the positive electrode film being extruded directly onto rollers.
Figure 2C:
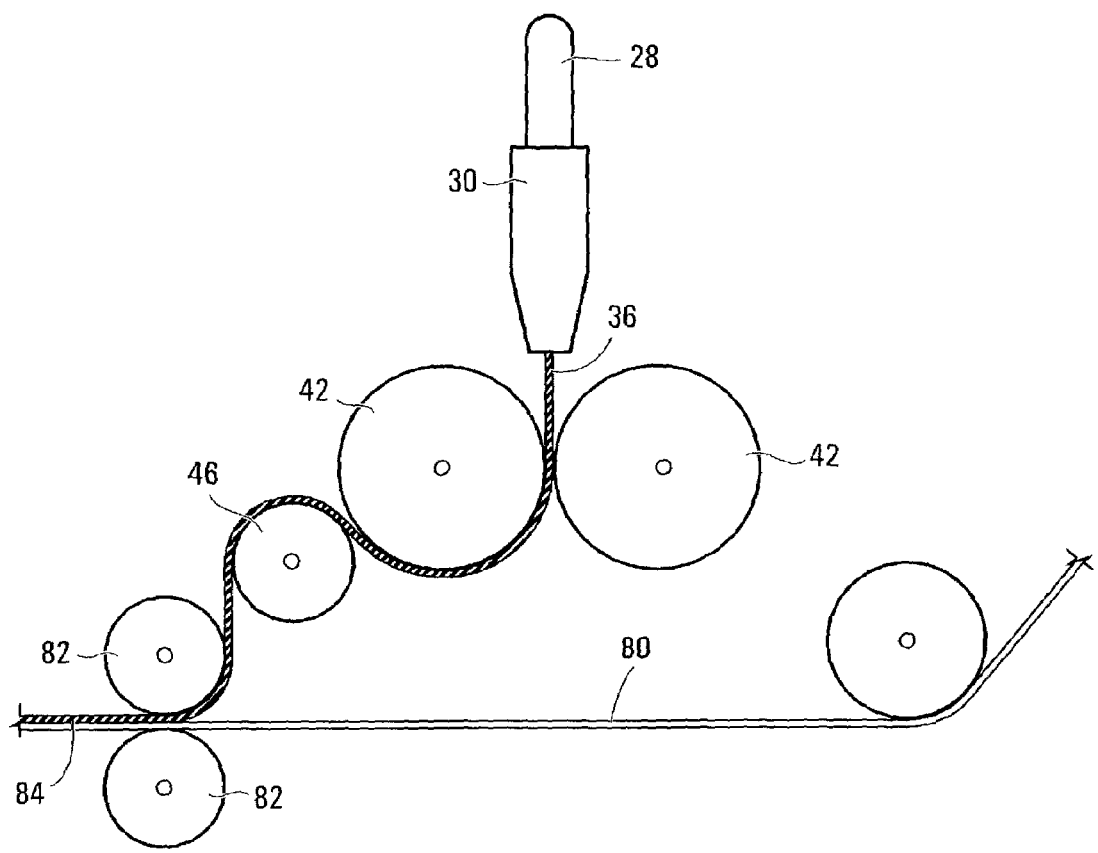
FIG. 2C is a schematic front view of the extrusion die showing the positive electrode film being extruded directly onto rollers and routed around one of the rollers.

FIG. 2B illustrates another embodiment of the continuous manufacturing process of a positive electrode film or cathode film for alkali metal polymer electrochemical cells. In this embodiment, the cathode film 36 exiting die 30 is deposited directly between flat cylinder rollers 42 that are maintained at cool temperatures. This particular method eliminates any problems that may occur if the substrate films 38 or 40 of the previous embodiment rip or break under the pulling tension exerted by flat cylinder rollers 42. As shown in FIG. 2B, cathode film 36 exits die 30 in the form of a relatively thin sheet; the sheet 36 is taken up directly by the pair of flat cylinder rollers 42 which equalizes the thickness and surface finish of film 36 to provide a smooth and even surface. Flat cylinder rollers 42 may also reduce the thickness of the film 36 to its final thickness of about between 35 and 70 microns, if the film 36 exits die 30 with a thickness exceeding the target thickness of 35 to 70 microns. As previously mentioned, flat cylinder rollers 42 are maintained at temperatures below the ambient temperature and preferably at a temperature ranging from about −5° C. to about −30° C. to prevent adhesion of the film 36 to the flat cylinder rollers 42. Flat cylinder rollers 42 may also be provided with an anti-adhesive liner. The film 36 is then laminated onto a substrate 80, preferably a current collector substrate, traveling below flat cylinder rollers 42. The laminate 84 may then pass between a second pair of flat cylinder rollers 82 to promote adhesion of the cathode film 36 onto the substrate 80. As shown in FIG. 2C, the duration of contact between the extruded cathode film 36 and one of the cooled flat cylinder rollers 42 may be controlled by routing the cathode film 36 around an idle cylinder 46 in order to increase heat transfer efficiency. As illustrated in FIG. 2C, cathode film 36 remains in contact with one of the cooled cylinder rollers 42 through nearly 180 of rotation of the cooled cylinder rollers 42 thereby increasing the total heat transfer between the cathode film 36 and one of the cooled flat cylinder rollers 42.

As previously described, the cathode film 36 obtained via the embodiment illustrated in FIG. 2B may also be stretched to reduce its final thickness. The stretching of the extruded cathode material is achieved by selecting a rotating speed of the flat cylinder rollers 42 that exceeds the rate of discharge of the cathode material at the die opening. The speed differential between the rotating speed of the flat cylinder rollers 42 and the cathode material exiting die 30 will stretch the cathode film 36 thereby further reducing its thickness.

Another embodiment in which the cathode film 36 is deposited between the current collector and one of the flat cylinder rollers 42 is also contemplated, wherein the cathode film 36 is pressed directly between the surface of the roller 42 on one side and the current collector on the other side.

The positive electrode material or cathode material as described above is a very difficult material to extrude because of its high solid content, yet the content of active material in solid form in the cathode is relatively important. The more active material in the cathode, the better the performance of the finished product. The polyethylene oxide electrolyte is a binder and does not contribute to the energy content of the electrochemical cell being produced therefrom. However, a high solid content into the polyethylene oxide binder increases the extrusion temperature, the shear stress to which the mixture of cathode material is subjected to, and therefore increases the degradation of the polyethylene oxide binder making it difficult to extrude a positive electrode that will perform to specification. Furthermore, the lithium salt (TFSI) included in the positive electrode material increases ionic conductivity of the cathode but reduces the viscosity of the positive electrode material thereby increasing the difficulty of transporting the positive electrode/cathode slurry through mixing chamber 15, conduit 28 and die 30.

Typical cathode material for an alkali metal polymer electrochemical cell comprises carbon black as the only electrically conductive filler. However, carbon black has extremely small particles (sub microns). When mixed into the cathode material, the high surface area of these small particles are coated with a substantial portion of the polyethylene oxide binder which has the negative effect of decreasing the solid content of active material which can be absorbed by the polyethylene oxide binder. Carbon black particles also create agglomeration of the mixture, thereby increasing the likelihood of blockage in an extruder. and generally increasing the viscosity of the mixture. Graphite however displays an acceptable electronic conductivity and comprises larger particles having therefore less surface area to be coated by the polyethylene oxide binder with the effect of decreasing the viscosity of the mixture. Utilizing a blend of carbon black/graphite in the cathode material as opposed to only carbon permits a higher solid active material content in the cathode mixture and reduces the overall viscosity and potential blockage of the cathode mixture in the extruder without significantly reducing the electronic conductivity of the cathode.

Into the mix of cathode material in reservoir 34, an additive consisting of an ultra fine powder of metal oxide such as silica, aluminum, or titanium oxide with a particle size between about 7 and 40 nm as disclosed in U.S. Pat. Nos. 5,486,435 and 5,622,792 both of which are hereby incorporated by reference, may also be introduced. The role of the additive is to prevent or diminish the formation of adhesive solid blocks in the powder mixture in reservoir 34 and to allow its introduction into the second feed throat of the extruder. Preferred compositions of ultra fine powders of metal oxide include hydrogenated silica having a BET surface between 50 and 400 m2/g containing more than 99.8% silica in a concentration of less than 10% by weight with respect to the mixture of cathode material.

As previously mentioned, plasticizers or lubricants in small quantity (less than 5%/wt) may also be included in the polymer to optimize the mixing ability of the components of the cathode mixture and the viscosity of the mixture to facilitate the extrusion of the composite cathode material.

The extrusion process and the mixture of cathode material described above enables the extrusion of a positive electrode film having a total solid content by weight of between about 40 and 80 percent using a commercially available extrusion machine. Extruding the cathode material according to the invention provides a cathode having a porosity of less than 10%.

Figure 3:
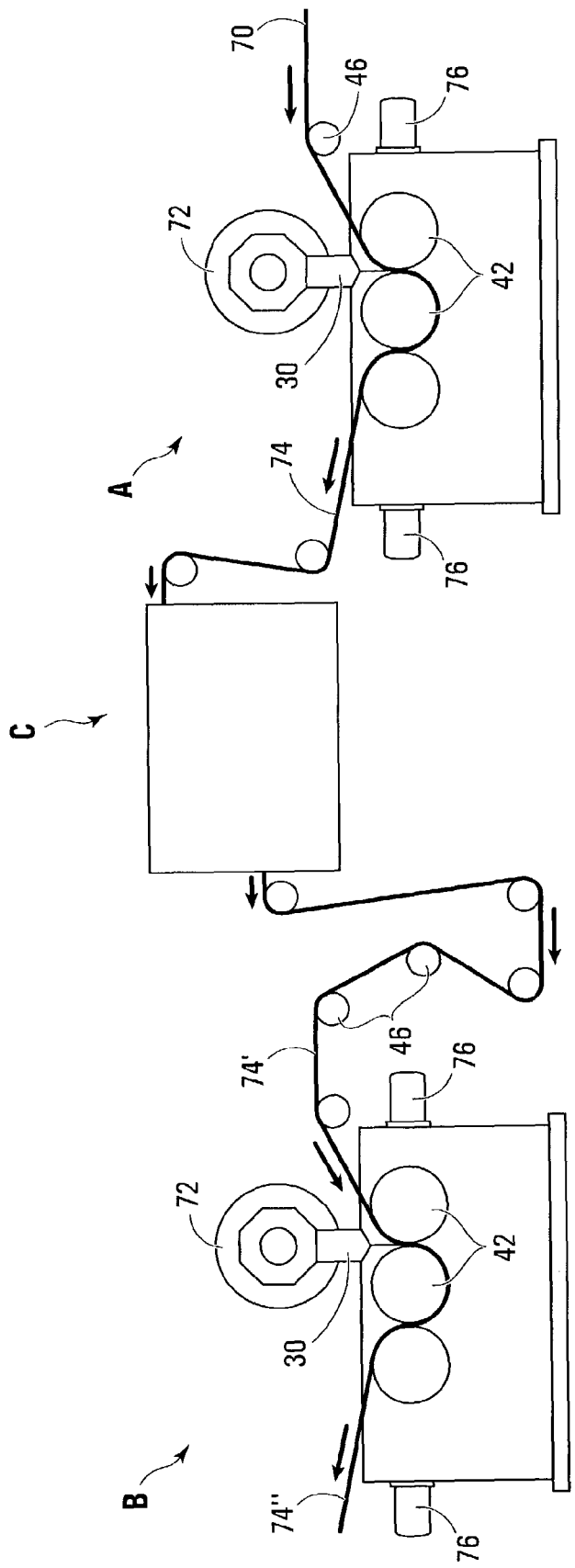
FIG. 3 is a schematic front view of two extrusion stations.

FIG. 3 illustrates another variant of the manufacturing process, in which a single current collector is coated on both sides with a positive electrode or cathode film. The current collector thin sheet 70, preferably comprising aluminum, is brought into a first extrusion station "A" comprising an extrusion machine 72 similar to the one depicted in FIGS. 2A or 2B where a positive electrode film is deposited by die 30 onto a first side of current collector 70. The two layer film 74 passes through a pair of rollers 42 which are controlled by either hydraulic or electric actuators 76, and then exits extrusion station "A". The two layer film 74 enters into a station "C" where it is turned upside down such that it exits station "C" with its layer of positive electrode film facing down. The face down two layer film 74' is transported into a second extrusion station "B" comprising an extrusion machine 72 where another positive electrode film is deposited by a die 30 onto the second side of the current collector such that both sides of the current collector are coated with a positive electrode film 36. The resulting three layer film 74" of current collector/twin positive electrodes then exits the second extrusion station "B" and is either rolled up for storage or transported to further processing stations to complete the assembly of the alkali metal polymer electrochemical cell.

The cathode material may be extruded through any classical sheet dies, such as those illustrated in FIGS. 4A to 4D, into a cathode sheet or film. The shape of typical sheet dies may come in a variety of designs such as with a fish tail inner configuration or a coat hanger inner configuration. A sheet die spreads the flow path of the cathode material over a wide surface and enable to extrude into thin sheets. For the extrusion of very thin sheets as described herein, channels may be carved into the die to direct an increased flow of cathode material toward the sides of the die exit to ensure that the cathode sheet being extruded has an even thickness throughout its width.

Although the present invention has been described in relation to particular variations thereof, other variation and modifications are contemplated and are within the scope of the present invention. Therefore the present invention is not to be limited by the above description but is defined by the appended claims.

What is claimed is:

1. A process for extruding a positive electrode sheet having at least 40%/wt of solid content for a solid polymer battery through a single or twin screw extruder, said process comprising:
   a) mixing an ionically conductive electrolyte including a polyethylene oxide based polymer and a lithium salt, an active cathode material, water in a proportion ranging from 0.005% to 5%/wt, and an electronic conductive material into a single or twin screw section of said extruder;
   b) melting the materials mixed in step a) through the single or twin screw section of the extruder to form an homogenous slurry and thereafter eliminating the water contained in the slurry by evaporation and dissipation of the water vapor in a decompression zone defined by a greater thread pitch of the screw or screws through a vent aligned with the decompression zone of the extruder;
   c) extruding a positive electrode material through a die opening in the form of a sheet having a thickness within a range of 40 to 200 microns and a porosity of less than 10%;
   d) feeding said positive electrode material in sheet form directly between a pair of rollers maintained at a temperature ranging from about $-5°$ C. to about $-30°$ C., without a substrate; and
   e) depositing said positive electrode material onto a substrate traveling near said rollers.

2. A process as defined in claim 1, wherein said pair of rollers rotate at a speed higher than a feeding rate of discharge of said positive electrode material through said die opening such that said positive electrode material in the form of a sheet is stretched thereby reducing the thickness of the sheet.

3. A process as defined in claim 2, wherein said pair of rollers further reduce the thickness of said positive electrode material in the form of a sheet to a thickness of between about 25 microns and about 100 microns by calendering, laminating or rolling the sheet.

4. A process as defined in claim 1, wherein said pair of rollers reduce the thickness of said positive electrode material in the form of a sheet to a thickness of between about 25 microns and about 100 microns by calendering, laminating or rolling the sheet.

5. A process as defined in claim 1, wherein said positive electrode material in the form of a sheet remains in contact with a particular one of said pair of rollers through a portion of the rotation of that particular roller, thereby increasing the heat transfer between the positive electrode material in the form of a sheet and the particular roller.

6. A process as defined in claim 1, wherein the sheet of extruded positive electrode material has a thickness of between 35 and 70 microns after calendaring between said pair of rollers.

7. A process as defined in claim 1, wherein water is mixed with the ionically conductive electrolyte, the active cathode material and the electronic conductive material in a proportion ranging from 0.1% to 0.8%/wt.

* * * * *